United States Patent
Kreiner et al.

(10) Patent No.: US 11,665,768 B2
(45) Date of Patent: *May 30, 2023

(54) SYSTEMS AND METHODS FOR ESTABLISHING NETWORK CONNECTIONS

(71) Applicant: AT&T Intellectual Property I, L.P., Atlanta, GA (US)

(72) Inventors: Barrett Kreiner, Woodstock, GA (US); Ryan Schaub, Norcross, GA (US); Timothy Knezevich, Mentor, OH (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 85 days.

This patent is subject to a terminal disclaimer.

(21) Appl. No.: 17/242,958

(22) Filed: Apr. 28, 2021

(65) Prior Publication Data

US 2021/0251034 A1 Aug. 12, 2021

Related U.S. Application Data

(63) Continuation of application No. 16/374,424, filed on Apr. 3, 2019, now Pat. No. 11,026,285.

(51) Int. Cl.
| | | |
|---|---|---|
| *H04W 76/19* | (2018.01) | |
| *H04W 24/04* | (2009.01) | |
| *H04B 17/309* | (2015.01) | |
| *H04W 8/00* | (2009.01) | |
| *H04W 92/20* | (2009.01) | |

(52) U.S. Cl.
CPC .......... *H04W 76/19* (2018.02); *H04B 17/309* (2015.01); *H04W 8/005* (2013.01); *H04W 24/04* (2013.01); *H04W 92/20* (2013.01)

(58) Field of Classification Search
CPC .... H04B 17/309; H04W 24/04; H04W 76/19; H04W 8/005; H04W 92/045; H04W 92/20

See application file for complete search history.

(56) References Cited

U.S. PATENT DOCUMENTS

| | | |
|---|---|---|
| 7,321,571 B2 | 1/2008 | Schnack et al. |
| 7,839,771 B2 | 11/2010 | Zeng et al. |

(Continued)

FOREIGN PATENT DOCUMENTS

| | | |
|---|---|---|
| WO | 2011086151 A1 | 7/2011 |
| WO | 2015149725 A1 | 10/2015 |

(Continued)

*Primary Examiner* — Kashif Siddiqui
(74) *Attorney, Agent, or Firm* — Guntin & Gust, PLC; Mark Wilinski (57) ABSTRACT

Aspects of the subject disclosure may include, for example determining that a first connection between a first device and a wireless access point is not functional, wherein a non-functional connection between the first device and a backhaul network causes the first connection between the first device and the wireless access point to become not functional. Information is received from a second device via a second connection, wherein the second connection includes a wireless connection via a dedicated channel of a radio access network of the second connection. The dedicated channel will not be released while providing service via the second connection, the information being provided to the first device via a wireless channel. Other embodiments are disclosed.

20 Claims, 4 Drawing Sheets

(56) References Cited

U.S. PATENT DOCUMENTS

| | | |
|---|---|---|
| 8,175,594 B2 | 5/2012 | Attar et al. |
| 8,248,949 B2 | 8/2012 | Ozer et al. |
| 8,254,943 B1* | 8/2012 | Dinan .................. H04W 76/19 |
| | | 455/454 |
| 8,520,559 B2 | 8/2013 | Rao et al. |
| 8,804,502 B2 | 8/2014 | Henry et al. |
| 9,001,767 B1* | 4/2015 | Gatewood ............. H04W 72/04 |
| | | 370/328 |
| 9,119,107 B2 | 8/2015 | Timus et al. |
| 9,198,205 B2 | 11/2015 | Horneman et al. |
| 9,258,821 B2 | 2/2016 | Roddy et al. |
| 9,350,515 B2 | 5/2016 | Tellado et al. |
| 9,363,764 B2 | 6/2016 | Black et al. |
| 9,413,502 B2 | 8/2016 | Tellado et al. |
| 9,763,136 B2 | 9/2017 | Li et al. |
| 9,942,783 B2 | 4/2018 | Fan et al. |
| 9,986,448 B2 | 5/2018 | Byun et al. |
| 11,026,285 B2* | 6/2021 | Kreiner ................ H04W 76/19 |
| 2004/0213189 A1 | 10/2004 | Alspaugh et al. |
| 2007/0124443 A1* | 5/2007 | Nanda .................. H04W 28/12 |
| | | 709/223 |
| 2008/0240078 A1* | 10/2008 | Thubert ................ H04W 40/08 |
| | | 370/406 |
| 2008/0291846 A1* | 11/2008 | Lu ....................... H04W 40/246 |
| | | 370/254 |
| 2009/0213730 A1* | 8/2009 | Zeng .................... H04W 24/04 |
| | | 370/217 |
| 2012/0002537 A1* | 1/2012 | Bao ..................... H04W 24/04 |
| | | 370/221 |
| 2012/0082161 A1* | 4/2012 | Leung .................. H04W 48/16 |
| | | 370/392 |
| 2012/0224472 A1 | 9/2012 | Kim et al. |
| 2014/0177840 A1* | 6/2014 | Liu .................. H04W 28/0846 |
| | | 370/235 |
| 2015/0117210 A1* | 4/2015 | Yang .................... H04W 84/12 |
| | | 370/235 |
| 2015/0117328 A1* | 4/2015 | Llairo .................. H04L 45/245 |
| | | 370/329 |
| 2016/0345192 A1* | 11/2016 | Garg ................... H04L 12/2854 |
| 2017/0111228 A1 | 4/2017 | Obaidi et al. |
| 2020/0092784 A1* | 3/2020 | Hampel .............. H04B 7/15528 |
| 2020/0281037 A1* | 9/2020 | Cui ....................... H04W 76/19 |
| 2020/0323012 A1 | 10/2020 | Kreiner et al. |

FOREIGN PATENT DOCUMENTS

| | | |
|---|---|---|
| WO | 2015196358 A1 | 12/2015 |
| WO | 2016165050 A1 | 10/2016 |

* cited by examiner

SYSTEMS AND METHODS FOR ESTABLISHING NETWORK CONNECTIONS

CROSS REFERENCE TO RELATED APPLICATIONS

This application is a continuation of U.S. patent application Ser. No. 16/374,424 filed on Apr. 3, 2019. All sections of the aforementioned application are incorporated herein by reference in their entirety.

FIELD OF THE DISCLOSURE

The subject disclosure relates to network connections, and more specifically to systems and methods for establishing network connections.

BACKGROUND

Access points provide end user connectivity to a network. Network connectivity may be impaired due to physical damage to the access point, a lack of available power, or an inability of the access point to provide network backhaul. For example, an access point such as a base station may be unable to provide backhaul necessary for end user connectivity due to a damaged physical connection between the access point and a wide area network.

SUMMARY

According to an embodiment, a method includes determining, by an access point, that a first connection between a first device and the access point is not functional. A non-functional connection between the first device and a backhaul network causes the first connection between the first device and the access point to become not functional. The method also includes selecting, by the access point, a second device operable to provide backhaul to the access point. The method also includes establishing, by the access point, a second connection between the second device and the access point and receiving, by the access point, information from the second device via the second connection. The second connection is a wireless connection. The method further includes communicating, by the access point, the information to the first device.

According to another embodiment, a system includes one or more processors and a memory storing instructions that, when executed by the one or more processors, cause the one or more processors to perform operations including determining, by an access point, that a first connection between a first device and the access point is not functional. A non-functional connection between the first device and a backhaul network causes the first connection between the first device and the access point to become not functional. The operations also include selecting, by the access point, a second device operable to provide backhaul to the access point. The operations also include establishing, by the access point, a second connection between the second device and the access point and receiving, by the access point, information from the second device via the second connection. The second connection is a wireless connection. The operations further include communicating, by the access point, the information to the first device.

According to yet another embodiment, one or more computer-readable storage media embody instructions that, when executed by a processor, cause the processor to perform operations including determining, by an access point, that a first connection between a first device and the access point is not functional. A non-functional connection between the first device and a backhaul network causes the first connection between the first device and the access point to become not functional. The operations also include selecting, by the access point, a second device operable to provide backhaul to the access point. The operations also include establishing, by the access point, a second connection between the second device and the access point and receiving, by the access point, information from the second device via the second connection. The second connection is a wireless connection. The operations further include communicating, by the access point, the information to the first device.

Technical advantages of this disclosure may include one or more of the following. By enabling a device to provide backhaul to an access point (e.g., a cell site) through a "normal" cellular connection, the access point can be returned to service significantly faster than current solutions that bring an alternate access point (e.g., a Cell on Light Trucks (COLT) or Cell on Wheels (COW)) to the location of the access point. Utilizing a device to provide backhaul to the access point eliminates the need for service personnel to physically gain access to the facility of the access point, which is physically safer for personnel and equipment. Utilizing the backhaul device reduces power requirements for recovery solutions and removes the need for additional powered devices. Using the same connectivity for the alternate backhaul eliminates the need for cabling between the access point and the backhaul, which may save time and resources.

Channels allocated to the connection between the access point and the backhaul device may be tailored to the actual available backhaul, which may improve channel efficiency. Backhaul devices may be pre-staged (e.g., pre-connected) as part of area network deployments by placing backhaul devices at cell sites such as video-ready access devices (VRADs), serving area interfaces (SAIs), neighborhood boxes (e.g., U-Verse boxes), etc. Multiple redundant backhaul devices may be provided for in-range cell sites. The backhaul devices may be automatically enabled remotely, which prevents the need for initial emergency personnel deployment and reduces network downtime and risk. The backhaul devices can be used to remotely monitor alarms and status of access points. The backhaul devices may allow phone service and limited bandwidth connectivity while the damaged backhaul is repaired.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

Reference will now be made to the accompanying drawings, which are not necessarily drawn to scale, and wherein.

DETAILED DESCRIPTION

A connection between a device and an access point may be not functional due to a backhaul failure. Alternate backhaul solutions, such as satellite and microwave, require direct connectivity to the access point network infrastructure, which requires service personnel to physically access the location of the access point to connect the alternate backhaul. The access point may not be easily accessible due to security concerns, road damage, and equipment and personnel availability.

Another backhaul solution is to establish a transient network provided by mobile solutions such as COLTs, COWs, Flying Cell Towers on drones, blimps, and other aircraft, and the like. However, these mobile solutions may require clear skies, the range of the mobile solution may be less than the range of the access point, and the backhaul may experience high latency.

This disclosure provides systems and methods for establishing network connections by enabling a backhaul device to connect to an access point and provide backhaul through a cellular connection. The backhaul device works as a reverse hotspot to provide backhaul to the access point, which may eliminate the need to physically access the access point, reduce latency, and increase the connection range as compared to other backhaul solutions.

Figure 1:
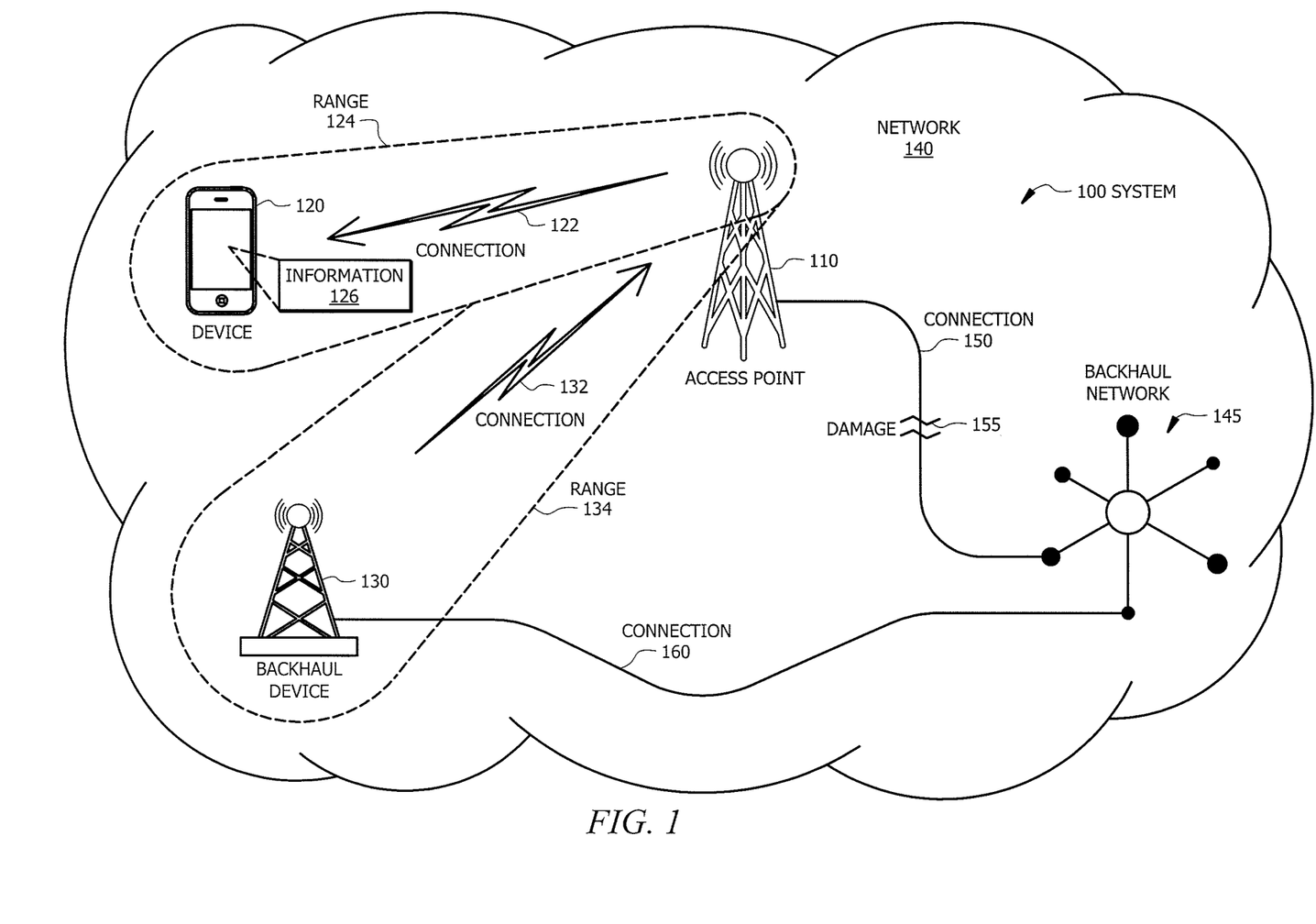
FIG. 1 illustrates an example system for establishing a network connection.
Figure 2:
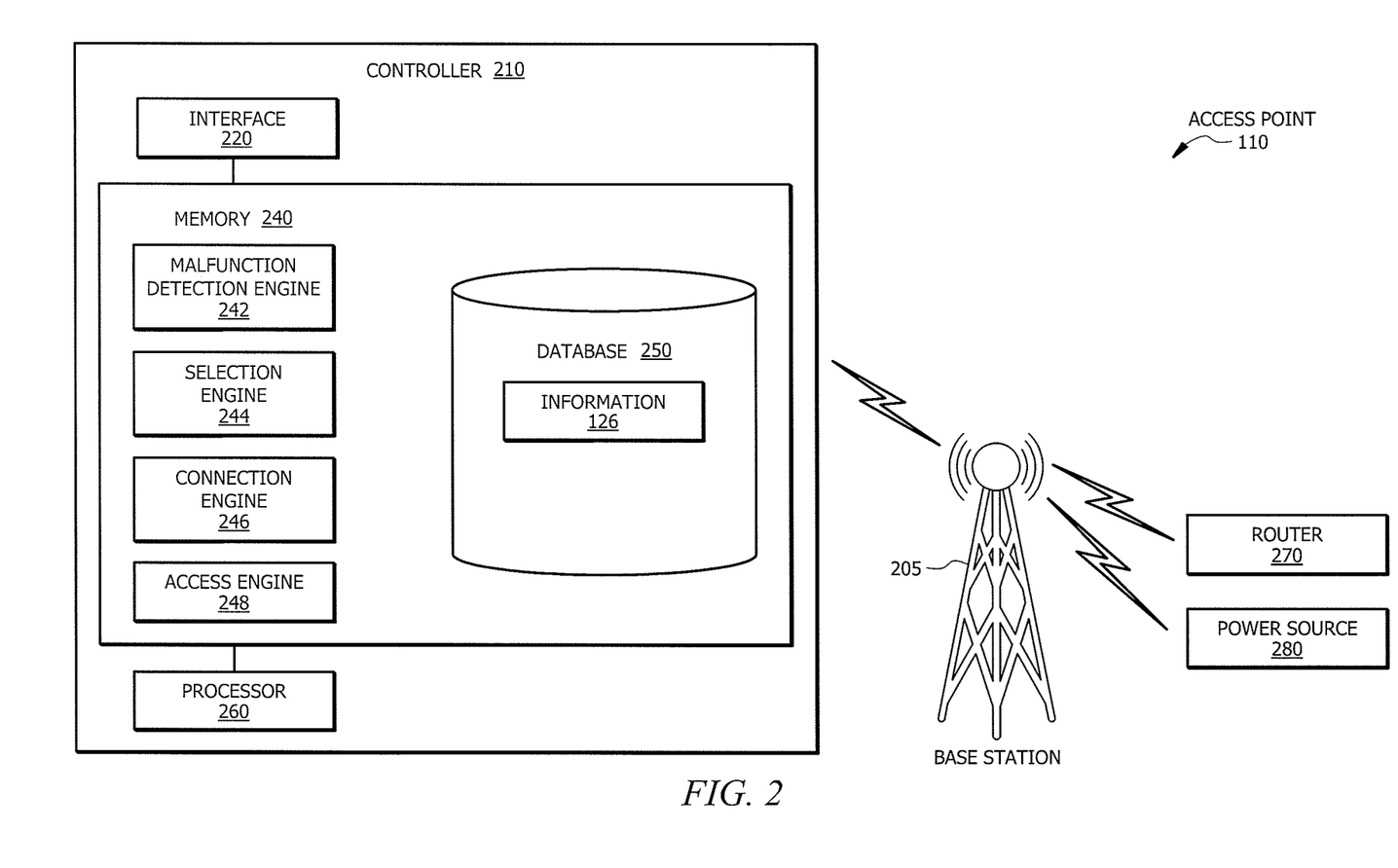
FIG. 2 illustrates an example access point that may be used by the system of FIG. 1.
Figure 3:
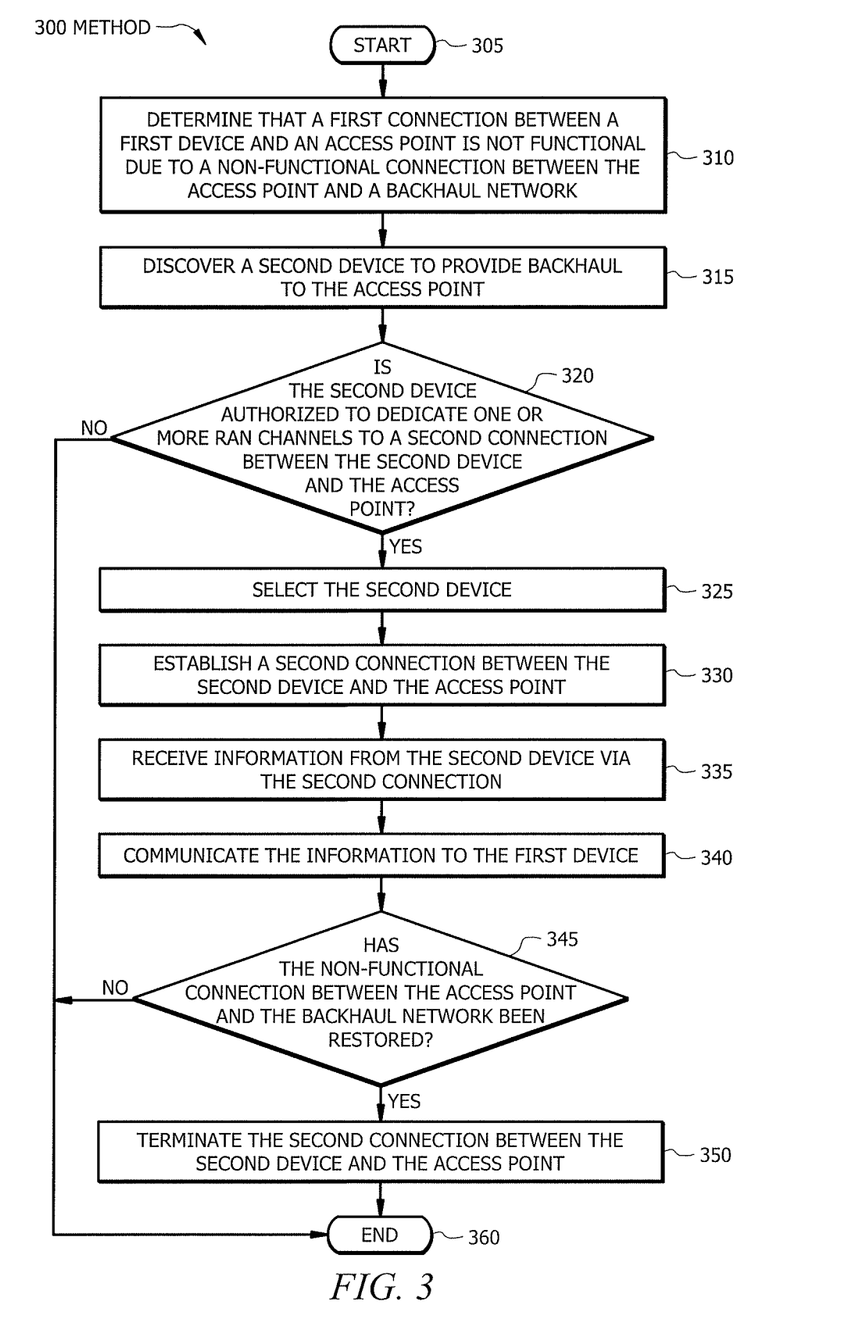
FIG. 3 illustrates an example method for establishing a network connection.
Figure 4:
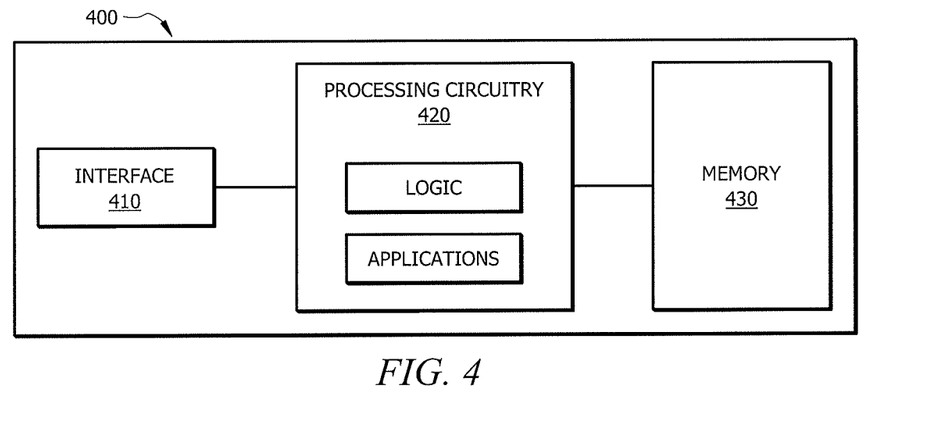
FIG. 4 illustrates an example computer system that may be used by the systems and methods described herein.

FIGS. 1 through 4 show example systems and methods for establishing network connections. FIG. 1 shows an example system for establishing a network connection, and FIG. 2 shows an example access point that may be used by the system of FIG. 1. FIG. 3 shows an example method for establishing a network connection. FIG. 4 shows an example computer system that may be used by the systems and methods described herein.

FIG. 1 illustrates an example system 100 for establishing a network connection. System 100 of FIG. 1 includes an access point 110, a device 120, a connection 122 between access point 110 and device 120, information 126, a backhaul device 130, a connection 132 between access point 110 and backhaul device 130, a network 140, a backhaul network 145, a connection 150 between backhaul network 145 and access point 110, and a connection 160 between backhaul network 145 and backhaul device 130. System 100 or portions thereof may be associated with an entity, which may include any entity, such as a business or company that provides network (e.g., cellular) services. The elements of system 100 may be implemented using any suitable combination of hardware, firmware, and software. For example, one or more components of system 100 may be implemented using one or more components of the computer system of FIG. 4.

FIG. 1 illustrates an example system 100 for establishing a network connection. System 100 of FIG. 1 includes an access point 110, a device 120, a connection 122 between access point 110 and device 120, information 126, a backhaul device 130, a connection 132 between access point 110 and backhaul device 130, a network 140, a backhaul network 145, a connection 150 between backhaul network 145 and access point 110, and a connection 160 between backhaul network 145 and backhaul device 130. System 100 or portions thereof may be associated with an entity, which may include any entity, such as a business or company that provides network (e.g., cellular) services. The elements of system 100 may be implemented using any suitable combination of hardware, firmware, and software. For example, one or more components of system 100 may be implemented using one or more components of the computer system of FIG. 4.

Access point 110 represents any component used to establish a connection to one or more components of network 140. For example, access point 110 may establish a wireless network connection 122 between device 120 and backhaul network 145. As another example, access point 110 may establish a wireless network connection 132 between backhaul device 130 and backhaul network 145. Access point 110 may be a base station. The base station may include a radio receiver/transmitter that serves as a hub of a network (e.g., a local wireless network portion of network 140). Access point 110 may serve as a gateway between a wired network (e.g., connection 150) and a wireless network (e.g., connection 122).

Access point 110 may include a cell tower, one or more antennas, one or more cables, one or more radios, one or more controllers, one or more routers, one or more power sources, and/or any other suitable equipment for establishing a connection to network 140. Access point 110 may be connected (e.g., hardwired) to other devices (e.g., network switches, routers, broadband modems, and the like). Access point 110 may handle access requests from one or more devices (e.g., device 120 and backhaul device 130). Access point 110 may allocate access to device 120 and/or backhaul device 130. Access point 110 may revoke access from device 120 and/or backhaul device 130. Access point 110 may have a range represented by an area surrounded by access point 110 where a device can receive signals from access point 110. The range of access point 110 may be measured in miles from access point 110. The range of access point 110 may vary depending on a location (e.g., a rural or open area) of access point 110, a height of a cell tower of access point 110, a type of radio of access point 110, and the like. Access point 110 is described in more detail in FIG. 2 below.

Device 120 of system 100 represents any suitable computing component that may be used to communicate information. Device 120 may include one or more mobile devices, such as a phone (e.g., a smartphone), a laptop computer, a tablet computer, a camera (e.g., a video camera), wearables, and toys. Device 120 may include one or more non-mobile devices, such as a television, a desktop computer, a webcam, a printer, speakers, a smart appliance, and a smart meter. Device 120 may include one or more sensing devices, such as a motion detector, a smart thermostat, a door lock sensor, a smart light bulb, and a lawn moisture sensor. Device 120 may have wireless network connection capabilities (e.g., WI-FI and/or Bluetooth capabilities). Device 120 may be used to provide voice connections, browse websites, stream multimedia (e.g., linear non-interactive multimedia), provide an augmented reality (AR) or a virtual reality (VR) interactive experience, and the like. Device 120 may be used to monitor traffic, environmental conditions, security, and the like.

Device 120 may communicate with access point 110 via connection 122. Connection 122 receives backhaul from connection 150 between access point 110 and backhaul network 145. Connection 122 may be a wireless connection. Range 124 between device 120 and access point 110 is within the range of access point 110. Device 120 may receive information 126 from access point 110 and/or communicate information 126 to access point 110.

Connection 122 provides device 120 access to other devices (e.g., device 130 of FIG. 1) connected to backhaul network 145. Connection 122 may be isolated from the underlying infrastructure (e.g., access point 110 and connection 150) to prevent device 120 from eavesdropping on another device 120 connected to access point 110 and/or to prevent device 120 from directly accessing access point 110 or connection 150. Connection 120 may be isolated from the underlying infrastructure with a Virtual Local Area Network (VLAN) construct.

Information 126 is any information communicated between components of network 140. Information 126 may include one or more requests from one or more components of network 140 to access one or more portions of network 140. Information 126 may include one or more requests for data (e.g., voice data). Information 126 may include registration information associated with device 120. Registration information may include a hardware address (e.g., a MAC address) of device 120 and a type of device 120. Information 126 may include requirements of device 120 for accessing network 140. The requirements of device 120 may include minimum bandwidth requirements, maximum bandwidth requirements, directional requirements, latency requirements, Quality of Service (QoS) requirements, frequency band capabilities, and the like.

Information 126 may include information associated with a data session. The data session is any temporary and interactive information interchange between device 120 and network one or more components of network 140. The data session may be an audio session, a video session, a file transfer, or a combination thereof. The data session may be a text message or a social media message, a web conference, or a voice telephone call. The data session may involve online gaming, downloading music files, streaming music (e.g., streaming music on a smart phone), streaming television shows, streaming movies, uploading statistics (e.g., uploading statistics for connected and/or autonomous vehicles and/or drones), downloading firmware, and/or updating software.

In certain embodiments, device 120 may include a hotspot. A hotspot is a wireless local area network (LAN) node that provides a connection from device 120. The hotspot may be designed to provide a bridge between two types of networks (e.g., a wireless to wireless network or wireline to wireless network). For example, device 120 may be a cellular phone or a home phone and internet device that provides WI-FI and physical network access to nearby devices from a subscribed cellular (e.g., 4G, Long Term Evolution (LTE), 5G, etc.) service.

Backhaul device 130 of system 100 represents any suitable computing component that may be used to provide backhaul to access point 110. Backhaul is the ability to establish a connection (e.g., connection 160) with backhaul network 145. Backhaul device 130 may utilize the same or similar hardware as a traditional hotspot to provide backhaul service to access point 110 by reversing the network connection. Backhaul device 130 is connected to an available backhaul service via a non-cellular network. In the illustrated embodiment, backhaul device 130 is connected to backhaul network 145 using connection 160. Connection 160 may utilize one or more of the following: a satellite dish, a very-high-bit-rate digital subscriber line (VDSL), a fiber source, a copper source, a microwave source, and the like. Connection 160 may be a physical link (e.g., Ethernet) or a wireless link (e.g., WI-FI). Range 134 between backhaul device 130 and access point 110 is within the range of access point 110.

Backhaul device 130 may connect to access point 110 via connection 132. Connection 132 may be a cellular connection established from backhaul device 130 to access point 110. Connection 132 may be implemented when access point 110 cannot access backhaul network 145. Connection 132 receives backhaul from connection 160 between backhaul deice 130 and backhaul network 145. Backhaul device 130 may establish a handshake with access point 110 if access point 110 determines that backhaul device 130 is authorized to use one or more channels (e.g., Radio Access Network (RAN) channels) for connection 132. The one or more channels are dedicated to connection 132 such that connection 132 will not be released (e.g., bumped) while providing service. Backhaul device 130 may be granted access to a portion of network 140 that is normally prohibited from a cellular client connection. In an embodiment, firmware on backhaul device 130 may be upgraded to provide security (e.g., to enable the handshake) and allow access to one or more components of network 140.

Backhaul device 130 may include one or more mobile devices, such as a cellular phone (e.g., a smartphone), a laptop computer, a tablet computer, a camera (e.g., a video camera), wearables, and toys. Backhaul device 130 may include one or more non-mobile devices, such as a television or a desktop computer. Backhaul device 130 may have wireless network connection capabilities (e.g., WI-FI and/or Bluetooth capabilities).

Network 140 is any type of network that facilitates communication between components of system 100. One or more portions of network 140 may include an ad-hoc network, an intranet, an extranet, a virtual private network (VPN), a LAN, a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a 3G network, a 4G network, a 5G network, a LTE cellular network, a combination of two or more of these, or other suitable types of networks. One or more portions of network 140 may include one or more access (e.g., mobile access), core, and edge networks (e.g., a 5G core network). A 5G network may include a 5G New Radio (5G NR). Network 140 may include one or more networks.

Network 140 may be any communications network, such as a private network, a public network, a connection through the Internet, a mobile network, a WI-FI network, a Bluetooth network, etc. One or more components of system 100 may communicate over network 140. For example, access point 110 may communicate over network 140, including receiving information from and/or transmitting information to device 120, backhaul device 130, and/or backhaul network 145. One or more components of network 140 may include one or more access, core, and edge networks.

Backhaul network 145 is a portion of network 140 that provides backhaul to one or more components of system 100. For example, backhaul network 145 may provide backhaul to backhaul device 130 via connection 160. In certain embodiments, backhaul network 145 may be a non-cellular network. In the illustrated embodiment of FIG. 1, backhaul network 145 is a WAN. A WAN may extend over a large geographical distance. Backhaul network 145 includes one or more nodes that serve as redistribution points or communication endpoints. The nodes of backhaul network 145 may include one or more physical network nodes (e.g., computers, packet switches, modems, and the like). Although this disclosure shows backhaul network 145 as being a particular kind of network, this disclosure contemplates any suitable network.

Connection 150 represents any connection between backhaul network 145 and access point 110 that facilitates communication between backhaul network 145 and access point 110. Connection 150 provides backhaul to connection 122 between access point 110 and device 120. Connection 150 may include one or more physical links (e.g., Ethernet) and/or wireless links (e.g., WI-FI). Connection 150 may utilize one or more of the following: a satellite dish, a VDSL, a fiber source, a copper source, a microwave source, and the like. In the illustrated embodiment of FIG. 1, connection 150 is a wireline connection.

Connection 150 between access point 110 and backhaul network 145 may not function as a result of one or more conditions. The conditions may include physical damage to access point 110. For example, one or more components (e.g., a tower, an antenna, cabling, equipment, etc.) of access point 110 may become inoperable due to wear (e.g., corrosion), fractures, weather conditions (e.g., rain, ice, sun, wind, etc.), and the like. The conditions may include insufficient power of access point 110 to establish connection 150. For example, one or more components of access point 110 may lose power due to a power outage. The conditions may include physical damage 155 to connection 150. For example, connection 150 may include fiber that has been damaged due to crimping, bending, straining, and the like. As another example, connection 150 may include one or more components (e.g., connectors) that become damaged due to scratches, defects, dirt, and the like. Since connection 122 between access point 110 and device 120 depends on backhaul from connection 150 between access point 110 and backhaul network 145, connection 122 may not function (e.g., fail) as a result of connection 150 not functioning (e.g., failing).

Although FIG. 1 illustrates a particular arrangement of access point 110, device 120, connection 122 between access point 110 and device 120, information 126, backhaul device 130, connection 132 between access point 110 and backhaul device 130, network 140, backhaul network 145, connection 150 between backhaul network 145 and access point 110, and connection 160 between backhaul network 145 and backhaul device 130, this disclosure contemplates any suitable arrangement of access point 110, device 120, connection 122 between access point 110 and device 120, information 126, backhaul device 130, connection 132 between access point 110 and backhaul device 130, network 140, backhaul network 145, connection 150 between backhaul network 145 and access point 110, and connection 160 between backhaul network 145 and backhaul device 130.

Although FIG. 1 illustrates a particular number of access points 110, devices 120, connections 122 between access point 110 and device 120, information 126, backhaul devices 130, connections 132 between access point 110 and backhaul device 130, networks 140, backhaul networks 145, connections 150 between backhaul network 145 and access point 110, and connections 160 between backhaul network 145 and backhaul device 130, this disclosure contemplates any suitable number of access points 110, devices 120, connections 122 between access point 110 and device 120, information 126, backhaul devices 130, connections 132 between access point 110 and backhaul device 130, networks 140, backhaul networks 145, connections 150 between backhaul network 145 and access point 110, and connections 160 between backhaul network 145 and backhaul device 130. For example, system 100 may include multiple backhaul devices 130.

In operation, access point 110 (e.g., a base station) determines that connection 122 between device 120 (e.g., a smartphone) and access point 110 is not functioning. For example, access point 110 may determine that access point 110 is unable to receive backhaul from backhaul network 145 (e.g., a WAN) due to physical damage to access point 110, an insufficient power supply of access point 110, or damage 155 to physical connection 150 between access point 110 and backhaul network 145. Access point 110 then selects backhaul device 130 (e.g., a smartphone) from a plurality of backhaul devices 130 that are equipped to provide backhaul to access point 110. Access point 110 determines that backhaul device 130 is authorized to dedicate one or more RAN channels to connection 132 between access point 110 and backhaul device 130 and grants backhaul device 130 access to access point 110. Access point 110 then establishes connection 132 between backhaul device 130 and access point 110. Backhaul device 130 receives backhaul from connection 160 (e.g., a wireline connection) between backhaul device 130 and backhaul network 145. Backhaul device 130 receives information 126 from backhaul network 145 via connection 160 and communicates information 126 to access point 110 via connection 132 (e.g., a wireless connection). Access point 110 then communicates received information 126 to device 120. In the event that access point 110 determines that connection 150 between access point 110 and backhaul network 145 has been restored, access point 110 terminates connection 132 between access point 110 and backhaul device 130.

As such, system 100 of FIG. 1 enables backhaul device 130 to provide backhaul to access point 110 in the event of backhaul failure at access point 110, which may allow access point 110 to return to service in less time than the time required to repair the original backhaul service or to bring in an alternate access point (e.g., a COLT or a COW).

FIG. 2 illustrates an example access point 110 that may be used by system 100 of FIG. 1. As described above in FIG. 1, access point 110 represents any component used to establish a connection to one or more other components of a network (e.g., network 140 of FIG. 1). Access point 110 of FIG. 2 includes a base station 205, a controller 210, a router 270, and a power source 280. Access point 110 or portions thereof may be associated with an entity, which may include any entity, such as a business or company that provides network (e.g., cellular) services. Access point 110 may be implemented using any suitable combination of hardware, firmware, and software. For example, one or more components of access point 110 may be implemented using one or more components of the computer system of FIG. 4. One or more components of access point 110 may be physically or logically co-located with each other in whole or in part.

Base station 205 of access point 110 is a fixed point of communication that provides a connection (e.g., connection 122, 132, 150, and/or 160 of FIG. 1) between devices (e.g., device 120 and/or backhaul device 130 of FIG. 1) and a network (e.g., backhaul network 145 of FIG. 1). Base station 205 may include one or more receivers (e.g., a Global Positioning System (GPS) receiver), one or more antennas (e.g., a GPS antenna), one or more base station radios, one or more controllers 210, one or more routers 270, one or more power sources 280, and/or any other suitable component for providing a network connection. Base station 205 may be coupled to a network node of a network. For example, base station 205 may be connected to a physical network node of backhaul network 145 of FIG. 1 via a wireline connection (e.g., DSL, coaxial cable, fiber, copper, and the like).

Controller 210 of access point 110 of is a component that controls and/or monitors the operations of access point 110. For example, controller 210 may control the operations of one or more components of base station 205. Controller 210 may manage and/or direct the flow of data between two components of a network (e.g., device 120 and a node of backhaul network 145 of FIG. 1). Controller 210 may include one or more hardware devices and/or one or more software programs. In the illustrated embodiment of FIG. 2, controller 210 of access point 110 includes an interface 220, a memory 240, and a processor 260.

Interface 220 of controller 210 represents any suitable computer element that can receive information from a network (e.g., network 140 of FIG. 1), transmit information through the network, perform suitable processing of the information, communicate to other components (e.g., device 120 and backhaul device 130 of FIG. 1), or any combination of the preceding. Interface 220 represents any port or connection, real or virtual, including any suitable combination of hardware, firmware, and software, including protocol conversion and data processing capabilities, to communicate through a LAN, a WAN, or other communication system that allows access point 110 to exchange information between its components and/or components of system 100 of FIG. 1.

Memory 240 of controller 210 stores, permanently and/or temporarily, received and transmitted information, as well as system software, control software, other software for controller 210, and a variety of other information. Memory 240 may store information for execution by processor 260. Memory 240 includes any one or a combination of volatile or non-volatile local or remote devices suitable for storing information. Memory 240 may include Random Access Memory (RAM), Read-only Memory (ROM), magnetic storage devices, optical storage devices, or any other suitable information storage device or a combination of these devices. Memory 240 may include any suitable information for use in the operation of controller 210. Additionally, memory 240 may be a component external to (or may be partially external to) controller 210. Memory 240 may be located at any location suitable for memory 240 to communicate with controller 210. Memory 240 may store a malfunction detection engine 242, a selection engine 244, a connection engine 246, and an access engine 248.

Malfunction detection engine 242 of controller 210 is an application that determines whether a connection between one or more components of system 100 of FIG. 1 is not functioning. Referring to FIG. 1, malfunction detection engine 242 may determine that connection 122 between device 120 and access point 110 is disabled. For example, malfunction detection engine 242 may determine that connection 122 between device 120 and access point 110 is unable to receive backhaul from connection 150 between access point 110 and backhaul network 145. As another example, malfunction detection engine 242 may determine that access point 110 is physically damaged and/or has insufficient power to establish connection 122. As still another example, malfunction detection engine 242 may determine that connection 150 between access point 110 and backhaul network 145 has physical damage 155.

Malfunction detection engine 242 may determine whether a connection between one or more components of system 100 of FIG. 1 has been restored. For example, referring to FIG. 1, malfunction engine 242 may determine that connection 122 between device 120 and access point 110 is operational, that physical damage to access point 110 has been repaired, that damage to connection 150 between access point 110 and backhaul network 145 has been repaired, any combination of the preceding, and the like. Malfunction detection engine 242 may determine that a connection is not functioning and/or has been restored by performing one or more diagnostic tests. Malfunction detection engine 242 may determine that a connection is not functioning and/or has been restored based on information received from a network administrator.

Selection engine 244 of controller 210 is an application that selects one or more backhaul devices (e.g., backhaul device 130 of FIG. 1) to provide backhaul to access point 110. Selection engine 244 may discover a plurality of devices (e.g., smartphones) within the range of access point 110 that can provide backhaul to access point 110. Selection engine 244 may then select one or more backhaul devices from the plurality of backhaul devices to provide backhaul to access point 110.

Selection engine 244 may select one or more backhaul devices based on one or more factors. Selection engine 244 may select a backhaul device based on a determination that the selected backhaul device has the highest signal strength of the discovered backhaul devices. The signal strength may be represented as a received signal strength indicator (RSSI), which is a measurement of the power present in the received signal. Selection engine 244 may select a backhaul device based on a determination that the selected backhaul device has one or more available channels required for the backhaul. Selection engine 244 may select a backhaul device based on a determination that the selected backhaul device has available bandwidth capacity for the backhaul. Selection engine 244 may select a backhaul device based on a determination that the selected backhaul device is authorized to dedicate one or more channels (e.g., RAN channels) to the connection between the selected backhaul device and access point 110.

In certain embodiments, selection engine 244 may select multiple backhaul devices to provide backhaul to access point 110 across multiple channels. For example, selection engine 244 may select a first backhaul device to provide backhaul to access point 110 across one or more first channels, and selection engine 244 may select a second backhaul device to simultaneously provide backhaul to access point 110 across one or more second channels. Selection engine 244 may determine a number of backhaul devices required to provide backhaul to access point 110 based on available channels, signal strength, available bandwidth, and the like.

Connection engine 246 of controller 210 is an application that establishes connections between access point 110 and other network components. As an example, referring to FIG. 1, connection engine 246 may establish wireless, cellular connection 132 between access point 110 and backhaul device 130. Connection engine 246 may then control the flow of data (e.g., information 126 of FIG. 1) from backhaul device 130, through access point 110, and to device 120. As another example, connection engine 246 may determine that connection 150 between access point 110 and backhaul network 145 has been restored and establish wireless, cellular connection 122 between device 120 and access point 110 using backhaul received from backhaul network 145 via connection 150. Connection engine 246 may then control the flow of data from backhaul network 145 to access point 110 and from access point 110 to device 120. In the event connection engine 246 determines that connection 150 between access point 110 and backhaul network 145 has been restored, connection engine 246 may terminate connection 132 between backhaul device 130 and access point 110.

In certain embodiments, connection engine 246 may determine that the aggregate bandwidth of multiple devices 120 of FIG. 1 exceeds the capacity of connection 150 of and/or the provisioned bandwidth of backhaul network 145 to connection 150, which may result in lack of service to one or more devices 120. As a result of this determination, connection engine 246 may establish connections 132 and 160. The added bandwidth via connection 160, which is constrained by the capacity of connection 132, may be added to the overall capacity of access point 110 such that access point 110 virtually pairs connections 150 and 160.

In certain embodiments, connection engine 246 may determine that connection 150 between backhaul network 145 and access point 110 of FIG. 1 has a planned event window (e.g., a service repair) that may constrain or intermittently cause connection 150 to become not functional. Based on this determination, connection engine 246 may replace connection 150 with connections 132 and 160 during the determined event window to avoid any potential network issues due to intermittent connectivity.

Access engine 248 of controller 210 is an application that determines whether one or more components of a network are authorized to communicate with access point 110. For example, access engine 248 may determine that device 120 and/or backhaul device 130 of FIG. 1 are authorized to exchange information with access point 110. As another example, access engine 248 may determine that one or more backhaul devices are authorized to dedicate one or more RAN channels to the second connection. Based on this determination, access engine 248 may grant the one or more backhaul devices access to access point 110. Access engine 248 may determine whether a device is authorized to communicate with access point 110 based on a security level associated with a requested connection. Access engine 248 may implement a handshake procedure between access point 110 and one or more backhaul devices prior to granting the one or more backhaul devices authorization. Access engine 248 may revoke access to one or more connections of the network. For example, access engine 248 may revoke access of one or more backhaul devices to access point 110 in the event that access point 110 no longer requires backhaul from the one or more backhaul devices.

Memory 240 of controller 210 may store database 250. Database 250 may store certain types of information for system 100 of FIG. 1. For example, database 250 may store information 126 of FIG. 1. As another example, database 250 may store one or more logs associated with the operations of controller 210. Database 250 may be any one or a combination of volatile or non-volatile local or remote devices suitable for storing information. Database 250 may include RAM, ROM, magnetic storage devices, optical storage devices, or any other suitable information storage device or a combination of these devices. Database 250 may be a component external to (or may be partially external to) controller 210. Database 250 may be located at any location suitable for database 250 to communicate with controller 210.

Processor 260 of controller 210 controls certain operations of controller 210 by processing information received from interface 220 and memory 240 or otherwise accessed by processor 260. Processor 260 communicatively couples to interface 220 and memory 240. Processor 260 may include any hardware and/or software that operates to control and process information. Processor 260 may be a programmable logic device, a microcontroller, a microprocessor, any suitable processing device, or any suitable combination of the preceding. Additionally, processor 260 may be a component external to mobility controller 210. Processor 260 may be located in any location suitable for processor 260 to communicate with controller 210. Processor 260 of controller 210 controls the operations of malfunction detection engine 242, selection engine 244, connection engine 246, and access engine 248.

Router 270 of access point 110 is a hardware device that forwards data between components of a network (e.g., network 140 of FIG. 1). Router 270 may be a wired or a wireless router. Router 270 may utilize one or more connections established by connection engine 246 to reverse a hotspot and provide service to other devices connected to access point 110. For example, referring to FIG. 1, router 270 may reverse connection 132 between backhaul device 130 and access point 110 to provide backhaul service to device 120.

Router 270 may reverse connection 132 by establishing connection 132 between access point 110 and 130 such that connection 132 is granted direct access to access point 110 similar to connection 150 of FIG. 1. Access point 110 may then utilize connection 160 via backhaul device 130 and connection 132 as an alternate backhaul provider. Connection 132 may pierce the layered protections that prevent a normal device (e.g., device 120) from utilizing connection 122 to gain similar access. In the illustrated embodiment of FIG. 1, backhaul device 130 is explicitly connected to an alternate backhaul path via connection 160, whereas device 120 is reliant on access point 110 for access.

Power source 280 of access point 110 is a hardware device that provides power to one or more components of access point 110. Power source 280 may include one or more components that connect access point 110 to an electrical grid. Power source 280 may include one or more batteries, generators, solar panels, and the like.

Although FIG. 2 illustrates a particular arrangement of access point 110, base station 205, controller 210, interface 220, memory 240, malfunction detection engine 242, selection engine 244, connection engine 246, access engine 248, database 250, processor 260, router 270, and power source 280, this disclosure contemplates any suitable arrangement of access point 110, base station 205, controller 210, interface 220, memory 240, malfunction detection engine 242, selection engine 244, connection engine 246, access engine 248, database 250, processor 260, routers 270, and power source 280.

Although FIG. 2 illustrates a particular number of access points 110, base stations 205, controllers 210, interfaces 220, memories 240, malfunction detection engines 242, selection engines 244, connection engines 246, access engines 248, databases 250, processors 260, routers 270, and power sources 280, this disclosure contemplates any suitable number of access points 110, base stations 205, controllers 210, interfaces 220, memories 240, malfunction detection engines 242, selection engines 244, connection engines 246, access engines 248, databases 250, processors 260, routers 270, and power sources 280. One or more components of access point 110 may be implemented using one or more components of the computer system of FIG. 4.

FIG. 3 shows an example method for establishing a network connection. Method 300 begins at step 305. At step 310, an access point (e.g., access point 110 of FIG. 1) determines that a first connection (e.g., connection 122 of FIG. 1) between a first device (e.g., device 120 of FIG. 1) and the access point is not functioning due to a non-functional connection (e.g., connection 150 of FIG. 1) between the access point and a backhaul network (e.g., backhaul network 145 of FIG. 1). The access point (e.g., a base station) may determine that the first connection between the first device (e.g., a smartphone) and the access point is disabled. As another example, the access point may determine that the access point is physically damaged and/or has insufficient power to establish the first connection. As still another example, the access point may determine that a physical connection between the access point and a wide area network (e.g., backhaul network 145 of FIG. 1) is damaged.

At step 315, the access point discovers a second device (e.g., backhaul device 130 of FIG. 1) that can provide backhaul to the access point. The second device may be a smartphone located within the range of the access point. At step 320, the access point determines whether the second device is authorized to dedicate one or more RAN channels to the second connection. If the access point determines that the second device is not authorized to dedicate one or more RAN channels to the second connection, method 300 moves from step 320 to step 360, where method 300 ends. If the access point determines that the second device is authorized to dedicate one or more RAN channels to the second connection, method 300 advances from step 320 to step 325.

At step 325, the access point selects the second device to provide backhaul to the access point. The access point may select the second device from a plurality of devices that can provide the backhaul to the access point based on a signal strength of the second device, the second device's availability of channels, an available bandwidth capacity of the second device, and/or any other suitable criteria.

At step 330, the access point establishes a second connection (e.g., connection 132 of FIG. 1) between the second device and the access point. The second connection may a wireless, cellular connection. Establishing the connection between the second device and the access point enables the second device to provide backhaul to the access point. For example, referring to FIG. 1, the second device may be backhaul device 130, which receives backhaul from backhaul network 145 via connection 160 between backhaul device 130 and backhaul network 145. Backhaul device 130 then provides backhaul to access point 110 via connection 132.

At step 335, the access point receives information (e.g., data packets) from the second device via the second connection. The second device may receive the information from a wide area network (e.g., backhaul network 145 of FIG. 1) using at least one of the following sources: a satellite dish, a VDSL, a fiber source, a microwave source, a base station, and the like. At step 340, the access point communicates the information received from the second device via the second connection to the first device.

At step 345, the access point determines whether the non-functional connection between the access point and the backhaul network has been restored. For example, referring to FIG. 1, access point 110 may determine that non-functional connection 150 between access point 110 and backhaul network 145 has been restored if access point 110 is able to receive backhaul from backhaul network 145 via connection 150 between access point 110 and backhaul network 145.

If the access point determines that the non-functional connection between the access point and the backhaul network has been restored, method 300 advances to step 360, where method 300 ends. If the access point determines that the non-functional connection between the access point and the backhaul network has been restored, method 300 advances from step 345 to step 350, where the access point terminates the second connection. Method 300 then advances from step 350 to step 360, where method 300 ends.

Modifications, additions, or omissions may be made to method 300 depicted in FIG. 3. Method 300 may include more, fewer, or other steps. For example, method 300 may include discovering a plurality of second devices operable to provide backhaul to the access point at step 315, selecting the plurality of second devices at step 325, and establishing a plurality of second connections between each of the plurality of second devices and the access point at step 330.

As another example, referring to FIG. 1, method 300 may add a step of establishing (e.g., automatically establishing) a connection between device 120 and access point 110 such that device 120 receives backhaul via connection 150 in the event non-functional connection 150 has been restored. Steps may be performed in parallel or in any suitable order. While discussed as specific components completing the steps of method 300, any suitable component may perform any step of method 300.

FIG. 4 shows an example computer system that may be used by the systems and methods described herein. For example, access point 110, device 120, backhaul device 130, network 140, and/or backhaul network 145 of FIG. 1 may include one or more interface(s) 410, processing circuitry 420, memory(ies) 430, and/or other suitable element(s). Interface 410 (e.g., interface 220 of FIG. 2) receives input, sends output, processes the input and/or output, and/or performs other suitable operation. Interface 410 may comprise hardware and/or software.

Processing circuitry 420 (e.g., processor 260 of FIG. 2) performs or manages the operations of the component. Processing circuitry 420 may include hardware and/or software. Examples of a processing circuitry include one or more computers, one or more microprocessors, one or more applications, etc. In certain embodiments, processing circuitry 420 executes logic (e.g., instructions) to perform actions (e.g., operations), such as generating output from input. The logic executed by processing circuitry 420 may be encoded in one or more tangible, non-transitory computer readable media (such as memory 430). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 430 (or memory unit) stores information. Memory 430 (e.g., memory 240 of FIG. 2) may comprise one or more non-transitory, tangible, computer-readable, and/or computer-executable storage media. Examples of memory 430 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method, comprising:
   determining, by a processing system including a processor, that a first connection between a first device and a wireless access point is not functional, wherein a non-functional connection between the first device and a backhaul network causes the first connection between the first device and the wireless access point to become not functional; and
   receiving, by the processing system, information from a second device via a second connection, wherein the second connection comprises a wireless connection via a dedicated channel of a radio access network of the second connection, wherein the dedicated channel will not be released while providing service via the second connection, the information provided to the first device via a wireless channel.

2. The method of claim 1, further comprising:
   determining, by the processing system, that the second device is authorized to dedicate one or more radio access network (RAN) channels comprising the dedicated channel to the second connection;
   granting, by the processing system, the second device access to the wireless access point in response to determining that the second device is authorized to dedicate the one or more RAN channels comprising the dedicated channel to the second connection;
   determining, by the processing system, that the non-functional connection between the first device and the backhaul network has been restored; and
   terminating, by the processing system, the second connection in response to determining that the non-functional connection between the first device and the backhaul network has been restored.

3. The method of claim 1, wherein determining, by the processing system, that the first connection between the first device and the wireless access point is not functional comprises at least one of the following:
   determining, by the processing system, that the first connection between the first device and the wireless access point is disabled;
   determining, by the processing system, that the wireless access point is physically damaged;
   determining, by the processing system, that the wireless access point has insufficient power to establish the first connection; and
   determining, by the processing system, that a physical connection between the wireless access point and the backhaul network is damaged.

4. The method of claim 1, further comprising:
   establishing, by the processing system, a second connection between the second device and the wireless access point, wherein the second device is selected from among a plurality of devices according to signal strength.

5. The method of claim 1, wherein the second connection is a cellular connection, the backhaul network is a cellular service backhaul network, the first device is a smartphone, the second device is a smartphone, and the wireless access point is a cellular base station.

6. The method of claim 1, wherein the wireless access point and the second device are located more than one mile apart while the wireless access point receives the information from the second device.

7. The method of claim 1, wherein selecting the second device is based on at least one of a signal strength, available channels, and available bandwidth capacity.

8. A system comprising:
   a processing system including a processor; and
   a memory that stores executable instructions that, when executed by the processing system, facilitate performance of operations, the operations comprising:
      determining that a first connection between a first device and a wireless access point is non-functional, wherein a non-functional connection between the first device and a backhaul network causes the first connection between the first device and the wireless access point to become non-functional; and
      receiving information from a second device via a second connection, wherein the second connection is a wireless connection via a dedicated channel of a radio access network of the second connection, wherein the dedicated channel will not be released while providing service via the second connection, the information provided to the first device via a wireless connection.

9. The system of claim 8, the operations further comprising:
   determining that the second device is authorized to dedicate one or more RAN channels comprising the dedicated channel to the second connection;
   granting the second device access to the wireless access point in response to determining that the second device is authorized to dedicate the one or more RAN channels comprising the dedicated channel to the second connection;
   determining that the non-functional connection between the first device and the backhaul network has been restored; and
   terminating the second connection in response to determining that the non-functional connection between the first device and the backhaul network has been restored.

10. The system of claim 8, wherein determining that the first connection between the first device and the wireless access point is non-functional comprises at least one of the following:
- determining that the first connection between the first device and the wireless access point is disabled;
- determining that the wireless access point is physically damaged;
- determining that the wireless access point has insufficient power to establish the first connection; and
- determining that a physical connection between the wireless access point and the backhaul network is damaged.

11. The system of claim 8, wherein the second device receives the information from a wide area network using at least one of a satellite dish, a VDSL, a fiber source, a microwave source, and a base station.

12. The system of claim 8, wherein the first device is a smartphone, the second device is a smartphone, and the wireless access point is a base station.

13. The system of claim 8, wherein the wireless access point and the second device are located more than one mile apart while the wireless access point receives the information from the second device.

14. The system of claim 8, wherein selecting the second device is based on at least one of a signal strength, available channels, and available bandwidth capacity.

15. A non-transitory, machine-readable medium comprising executable instructions that, when executed by a processing system including a processor, facilitate performance of operations, the operations comprising:
- determining that a first connection between a first device and an access point is non-functional, wherein a non-functional connection between the first device and a backhaul network causes the first connection between the first device and the access point to become non-functional; and
- receiving information from a second device via a second connection, wherein the second connection is a wireless connection via a dedicated channel of a radio access network of the second connection, wherein the dedicated channel will not be released while providing service via the second connection, the information provided to the first device via a wireless connection.

16. The non-transitory, machine-readable medium of claim 15, the operations further comprising:
- determining that the second device is authorized to dedicate one or more RAN channels comprising the dedicated channel to the second connection;
- granting the second device access to the access point in response to determining that the second device is authorized to dedicate the one or more RAN channels comprising the dedicated channel to the second connection;
- determining that the non-functional connection between the first device and the backhaul network has been restored; and
- terminating the second connection in response to determining that the non-functional connection between the first device and the backhaul network has been restored.

17. The non-transitory, machine-readable medium of claim 15, wherein determining, by the access point, that the first connection between the first device and the access point is non-functional comprises at least one of the following:
- determining that the first connection between the first device and the access point is disabled;
- determining that the access point is physically damaged;
- determining that the access point has insufficient power to establish the first connection; and
- determining that a physical connection between the access point and the backhaul network is damaged.

18. The non-transitory, machine-readable medium of claim 15, wherein the second device receives the information from a wide area network using at least one of a satellite dish, a VDSL, a fiber source, a microwave source, and a base station.

19. The non-transitory, machine-readable medium of claim 15, wherein the first device is a smartphone, the second device is a smartphone, and the access point is a base station.

20. The non-transitory, machine-readable medium of claim 15, wherein the access point and the second device are located more than one mile apart while the access point receives the information from the second device.

* * * * *